United States Patent [19]
Okabayashi et al.

[11] Patent Number: 4,610,162
[45] Date of Patent: Sep. 9, 1986

[54] FLUIDIC FLOWMETER

[75] Inventors: Makoto Okabayashi, Nabari; Masao Haruta, Mino, both of Japan

[73] Assignee: Osaka Gas Company, Osaka, Japan

[21] Appl. No.: 749,233

[22] Filed: Jun. 27, 1985

[30] Foreign Application Priority Data

Jun. 27, 1984 [JP] Japan .............................. 59-97398[U]
Mar. 28, 1985 [JP] Japan ................................... 60-66345

[51] Int. Cl.⁴ ............................ G01F 7/00; G01F 1/20
[52] U.S. Cl. .................................... 73/197; 73/861.19
[58] Field of Search ............... 73/197, 861.19, DIG. 8

[56] References Cited

U.S. PATENT DOCUMENTS

| | | | |
|---|---|---|---|
| 3,640,133 | 2/1972 | Adams | 73/861.19 |
| 3,902,367 | 9/1975 | Grant et al. | 73/861.19 |
| 4,107,990 | 8/1978 | Ringwall | 73/861.19 |

FOREIGN PATENT DOCUMENTS 0384383 12/1932 United Kingdom .................. 73/197

Primary Examiner—Charles A. Ruehl
Attorney, Agent, or Firm—Edwin E. Greigg

[57]  ABSTRACT

A fluidic flowmeter comprising a combination of an upstream fluidic element and a downstream fluidic element. One of the fluidic elements includes a jet nozzle having a smaller opening area than a jet nozzle of the other. The flowmeter further comprises a bypass passage disposed parallel to the former fluidic element and including valve means, preferably a diaphragm type governor valve. The governor valve includes a main valve member and an auxiliary valve member adapted to open by a fluid pressure upstream thereof when the main valve member is in a closed position. Each of the fluidic elements has a sensor disposed in one of return passages to detect flow rate variations therein. A flow rate indicating device is provided to derive flow rates from signals received from the sensors and indicate the flow rates.

10 Claims, 4 Drawing Figures

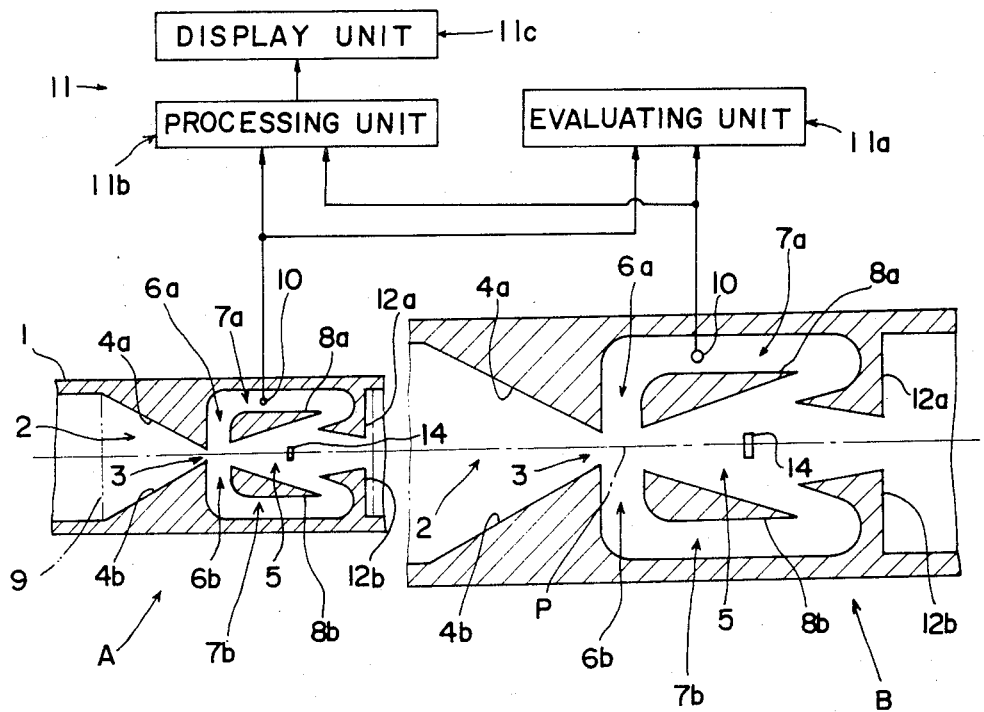
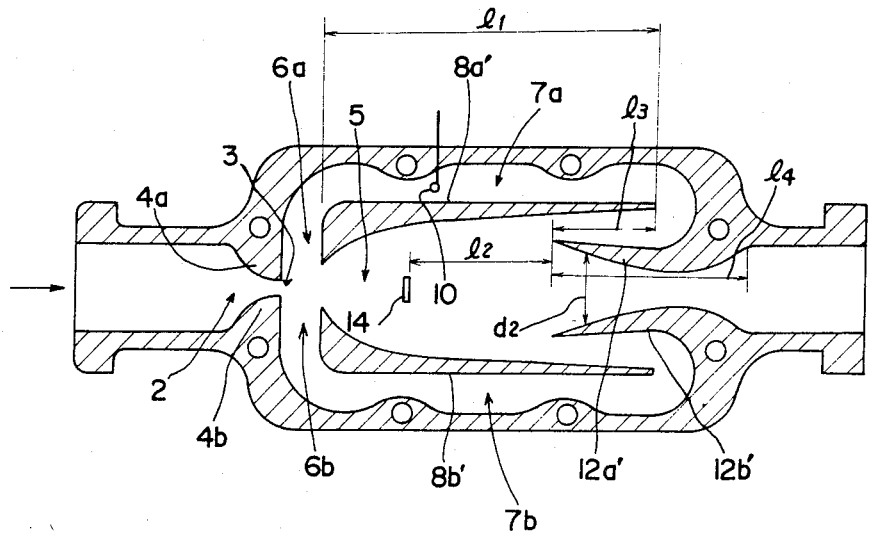

FLUIDIC FLOWMETER

BACKGROUND OF THE INVENTION

This invention relates to a fluidic flowmeter, and more particularly to a fluidic flowmeter comprising a fluidic element including a converging passage, a jet nozzle disposed downstream of the converging passage, a diverging passage disposed downstream of the jet nozzle, a pair of control nozzles disposed between the jet nozzle and the diverging passage and opposed to each other across and in a direction substantially perpendicular to a direction in which a fluid jet shoots from the jet nozzle, and return passages connecting a downstream position of the diverging passage to the control nozzles, respectively.

This type of flowmeter utilizes Coanda effect, namely a phenomenon in which a fluid jet shooting from the jet nozzle stabilizes in a flow along one of inclined walls of the diverging passage, and a phenomenon in which the fluid jet shooting from the jet nozzle flows alternately along the two walls of the diverging passage by actions of fluid jet shooting alternately from the two control nozzles. This flowmeter measures flow rates on the basis of frequency variations resulting from the alternation of directions in which the fluid jet shooting from the jet nozzle flows.

Conventional fluidic flowmeters of the type described above comprise only one fluidic element including a jet nozzle which defines only one outlet opening. Where the outlet opening has a small area for the purpose of high sensitivity so that a small flow rate may be measured with high precision, a great pressure loss occurs rendering a desired measurement impossible at times of large flow rate. Conversely, where the outlet opening has a large area to permit a large flow rate to be measured with high precision, the measurement sensitivity becomes poor at times of small flow rate. Thus, the conventional fluidic flowmeters have room for improvement from the point of view of measuring range where great flow rate variations are involved.

SUMMARY OF THE INVENTION

In view of the state of the art noted above, an object of this invention is to provide a fluidic flowmeter capable of measuring flow rates with high precision at all times regardless of great flow rate variations.

Another object of this invention is to provide a fluidic flowmeter capable of continuing a fluid supply in a satisfactory manner in spite of a sudden change in the flow rate and effective to prevent trouble attributable to the flowmeter such as a pilot burner of a gas appliance going out inadvertently.

In order to achieve the above objects, a fluidic flowmeter according to this invention comprises a first fluidic element including a converging passage, a jet nozzle disposed downstream of the converging passage, a diverging passage disposed downstream of the jet nozzle, a pair of control nozzles disposed between the jet nozzle and the diverging passage and opposed to each other across and in a direction substantially perpendicular to a direction in which a fluid jet shoots from the jet nozzle, and return passages connecting a downstream position of the diverging passage to the control nozzles, respectively, a second fluidic element connected to the first fluidic element, the second fluidic element being substantially identical in construction to the first fluidic element and including a jet nozzle having a smaller opening area than the jet nozzle of the first fluidic element, and bypass passage communicating with the first fluidic element in parallel with the second fluidic element, the bypass passage including valve means adapted to open when a flow rate exceeds a predetermined value.

The fluidic flowmeter according to the invention as described above has the following functional effect: At times of large flow rate the valve means is opened whereby the fluid flows in a large quantity through the first fluidic element and the bypass passage. At times of small flow rate the fluid flows through the two fluidic elements without passing through the bypass passage.

Accordingly, at times of large flow rate signals from the first fluidic element are utilized for measuring the large flow rate, the measurement being effected with high precision and without any significant pressure loss since the first fluidic element includes the jet nozzle having a large opening area. At times of small flow rate signals from the second fluidic element are utilized for measuring the small flow rate. The second fluidic element including the jet nozzle having a small opening area permits the measurement of small flow rate to be carried out with high sensitivity and with high precision. Consequently, this invention provides a fluidic flowmeter useful where great flow rate variations occur frequently and yet precise flow rate measurement is required. The flowmeter according to this invention is suitable, for example, as a consumer's flowmeter on a town gas or water pipe.

Incidentally, where the pressure loss is maintained below 15 mm $H_2O$, the prior art measurement noted above can comply with flow rate variations only in the range of 50–3,000 l/h whereas the measurement according to this invention can comply with flow rate variations in the range of 10–3,000 l/h or wider. Thus the fluidic flowmeter of this invention has been found to have the performance required of a town gas meter for measuring household consumption.

The valve means may preferably comprise a diaphragm type governor valve. Then at times of large flow rate there occurs a great difference between a fluid pressure upstream of the second fluidic element and a fluid pressure downstream thereof. Then the governor valve is opened to maintain the difference between the two pressures within a predetermined range, whereupon the fluid flows in a large quantity through the first fluidic element and the bypass passage. At times of small flow rate there occurs only a small difference between the fluid pressures upstream and downstream of the second fluidic element, and the difference remains within the predetermined range while the governor valve is fully closed. The fluid then flows in a small quantity through the two fluidic elements without passing through the bypass passage. Since the bypass passage is automatically opened and closed by a diaphragm, the measurement precision is maintained at a high level positively and at all times in spite of great flow rate variations.

Furthermore, since the governor valve acts to maintain the difference between the upstream pressure and downstream pressure within the predetermined range, the bypass passage is opened and closed in a reliable and stable manner without trouble such as chattering whereby the flow rate is measured reliably also when the flow rate is at a critical value for switching from one measuring mode to the other. More particularly, the governor valve may automatically be opened and closed in response to pressure variations at one position, but then the pressure that opens and closes the governor valve will greatly vary with the opening and closing of the governor valve per se. This will cause the governor valve to open and close repeatedly, which lowers the measuring precision to a serious degree. The present invention is free from such a disadvantage.

According to a further aspect of this invention, the governor valve includes a main valve member and an auxiliary valve member biased by a spring to a closed position relative to the main valve member, the auxiliary valve member being adapted to open by fluid pressure upstream thereof when the main valve member is in a closed position.

When, for example, a main burner is ignited by a pilot burner in a gas appliance while gas is flowing in a small quantity with the main valve member fully closed, the flow rate downstream of the flowmeter increases suddenly. As a result, the pressure difference across the main valve member increases which opens the main valve member. Even if at this time there is a delay in the opening of the main valve member which is possible because the valve opening force is imparted through the diaphragm, the auxiliary valve member is opened without delay by the pressure difference acting directly thereon. Therefore, this construction is capable of not only measuring the flow rate accurately in spite of great flow rate variations but also positively maintaining a sufficient fluid supply when a sudden flow rate increase takes place. This construction is free from such trouble as fire extinction in a gas appliance due to the gas pressure drop taking place as the main burner is ignited by the pilot burner.

Other objects and advantages of this invention will be apparent from the following description.

BRIEF DESCRIPTION OF THE DRAWINGS

FIG. 2 is a sectional view taken on line II—II of FIG. 1,

FIG. 4 is a sectional view of a modified fluidic element.

DESCRIPTION OF THE PREFERRED EMBODIMENTS

Figure 1:
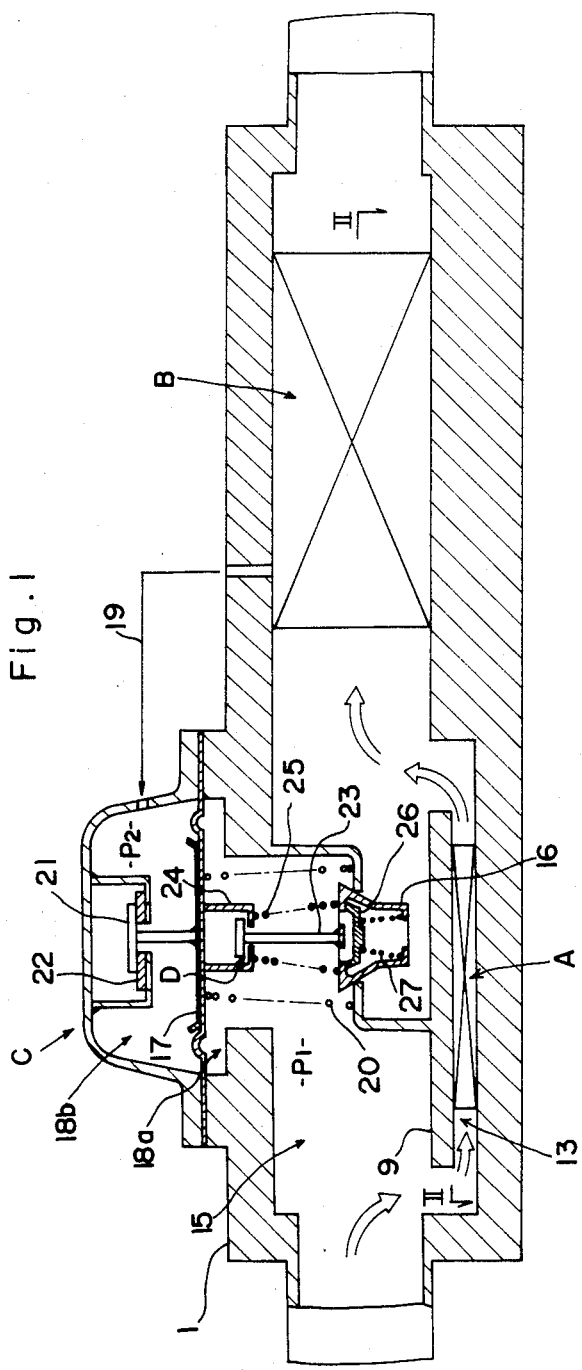
FIG. 1 is a sectional view of a fluidic flowmeter embodying this invention.

FIGS. 1 and 2 show an example of fluidic flowmeter embodying this invention, which comprises an upstream portion and a downstream portion defined in a pipe 1. The upstream portion is divided by a partition 9 into a narrow passage 13 and a broad bypass passage 15. The narrow passage 13 includes an upstream fluidic element A which will be described later. The bypass 15 includes a diaphragm type governor valve C to open and close the bypass passage 15. The downstream portion of the pipe 1 which communicates with the narrow passage 13 and with the bypass passage 15 includes a downstream fluidic element B to be described below.

The upstream and downstream fluidic elements A and B have a similar construction. Each fluidic element comprises a pair of first passage defining members 4a and 4b disposed symmetrically about a longitudinal axis P of the pipe 1 to define a converging passage 2 and a jet nozzle 3. The converging passage 2 directs fluid smoothly to the jet nozzle 3 from which the fluid shoots in a jet substantially parallel to the longitudinal axis P. Each fluidic element further comprises a pair of partition walls 8a and 8b disposed symmetrically about the longitudinal axis P to define a diverging passage 5, a pair of control nozzles 6a and 6b, and two return passages 7a and 7b connecting a downstream position of the diverging passage 5 to the control nozzles 6a and 6b, respectively. The control nozzles 6a and 6b are located between the jet nozzle 3 and the diverging passage 5 and opposed to each other across and in a direction substantially perpendicular to the direction in which the fluid jet shoots from the jet nozzle 3. Furthermore, a pair of second passage defining members 12a and 12b is disposed symmetrically about longitudinal axis P to define a restrictor passage downstream of the diverging passage 5.

When the fluid jet begins shooting from the jet nozzle 3, the fluid flows along one of the partition walls 8a by Coanda effect. This causes a great fluid energy to be imparted from the return passage 7a to the control nozzle 6a defined by the partition wall 8a, thereby causing the fluid jet to flow along the opposite partition wall 8b. Then a fluid energy of the opposite control nozzle 6b causes the fluid jet to flow along the first-mentioned partition wall 8a again. In this way the fluid shooting from the jet nozzle 3 flows alternately along the two partition walls 8a and 8b, whereby the flowing direction of the fluid jet changes in the sorter cycle the greater the quantity of the fluid jet and with quantitative correlation.

A target 14 is provided at a downstream position of the diverging passage 5 to promote stabilization of the fluid jet flow in either direction.

The upstream fluidic element A has, for example, a 5 mm height, a 0.5 mm nozzle width and a 2.5 mm² nozzle opening area, and the downstream fluidic element B has, for example, a 35 mm height, a 2 mm nozzle width and a 70 mm² nozzle opening area. Thus, the jet nozzle 3 of the upstream fluidic element A has a smaller opening area than the jet nozzle 3 of the downstream fluidic element B, the opening area of the former being 1/28 of the opening area of the latter. Thus, the correlation between the flow rate and the frequency with which the flowing direction of the fluid jet changes has high precision with the upstream fluidic element A when the flow rate is small and with the downstream fluidic element when the flow rate is large.

The fluidic flowmeter of this invention further comprises sensors 10 each disposed in one of the return passages 7a of each of the two fluidic elements A and B for detecting pressure or flow rate variations therein, and a flow rate indicating device 11 adapted to receive frequency signals from these sensors 10 indicating the pressure or flow rate variations, derive flow rates from the frequency signals and indicate the flow rates.

The governor valve C is operable when the flow rate exceeds a predetermined value, to maintain the difference (P1–P2) between a fluid pressure (P1) upstream thereof and fluid pressure (P2) downstream thereof within a predetermined range. This governor valve C comprises a main valve member 16 to open and close the bypass passage 15, and diaphragm 17 operatively connected to the main valve member 16. The diaphragm 17 lies between a pressure chamber 18a communicating with the bypass passage 15 upstream of the main valve member 16 and a pressure chamber 18b communicating through a passage 19 with an inlet side of the downstream fluidic element B. The diaphragm 17 is provided with a spring 20 which biases the diaphragm 17 toward its valve closing position, and a magnet 22 which acts to maintain the diaphragm 17 in the valve closing position by cooperation with a magnet 21. An engaging device D is provided between a rod 23 extending from the main valve member 16 and an engaging member 24 attached to the diaphragm 17. This engaging device D allows the diaphragm to move toward its valve opening position to a certain extent while the main valve member 16 is in a fully closed position. Further, a spring 35 extends between the main valve member 16 and the engaging member 24, the spring 25 causing the main valve member 16 to move from an open position to the closed position in unison with the movement of the diaphragm 17 to the valve closing position.

Figure 3:
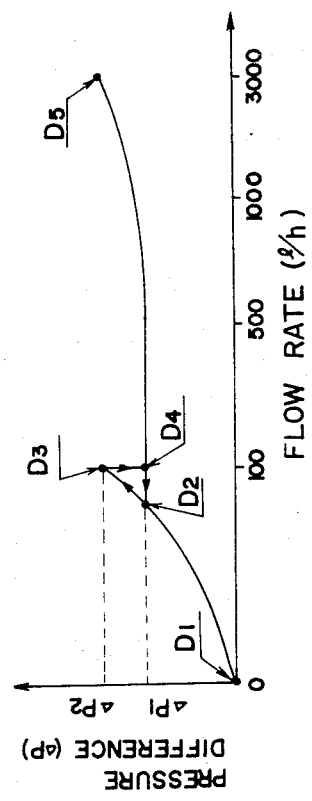
FIG. 3 is a graph showing pressure variations occurring with flow rate variations.

The pressure difference (P1-P2) varying with flow rate variations is, for example, as shown in FIG. 3. Assuming that the flow rate gradually increases from zero, the pressure difference (P1-P2) is small at an initial stage and the fluid flows from the upstream fluidic element A to the downstream fluidic element B with the governor valve C remaining in the fully closed position. The pressure difference increases from point D1 to point D2 corresponding to a first predetermined pressure difference $\Delta P1$, and from point D2 to point D3 with the governor valve C maintained in the closed position by the action of the magnet 22. When the pressure difference (P1-P2) reaches a second predetermined pressure difference $\Delta P2$, the diaphragm 17 moves to a position to release the magnet 21 from the magnet 22 whereupon the main valve member 16 is opened to decrease the pressure difference (P1-P2) from point D3 to point D4 and bring the pressure difference to the first predetermined pressure difference $\Delta P1$. Thereafter the pressure difference (P1-P2) is maintained constant for a time by a changing opening degree of the governor, valve C corresponding to flow rate increases. After the governor valve C assumes the fully open position the pressure difference slightly increases from point D4 and ultimately reaches point D5 corresponding to a maximum flow rate.

The governor valve C includes an auxiliary valve member 26 biased by a sping 27 to a closed position relative to the main valve member 16. This auxiliary valve member 26 is adapted to open by the upstream fluid pressure P1 when the main valve member 16 is fully closed. When the main valve member 16 is fully closed and the downstream pressure P2 drops suddenly and sharply, the auxiliary valve member 26 is temporarily opened until the main valve member 16 opens thereby checking the drop of the downstream pressure P2.

The flow rate indicating device 11 includes an evaluating unit 11a for judging whether frequency in a first signal received from the sensor 10 in the downstream fluidic element B is below a set value, a processing unit 11b operable on instructions from the evaluating unit 11a to derive the flow rates from a second signal received from the sensor 10 in the upstream fluidic element A when the frequency in the first signal is below the set value and to derive the flow rates from the first signal when the frequency in the first signal exceeds the set value, and a display unit 11c for indicating the flow rates. The flowmeter of this invention having the above flow rate indicating device 11 is capable of accurate measurement over a wide flow rate range of 10-3,000 l/h, for example, while maintaining the fluid pressure difference below 15 mm H$_2$O.

The above-mentioned set value is substantially at a midpoint between a minimum frequency in the first signal and a frequency therein at a time immediately before the opening of the governor valve C. In other words, when the flow rate increases, the evaluating unit 11a begins measuring the frequency in the first signal before the main valve member 16 opens. Conversely, when the flow rate drops, the evaluating unit 11a continues measuring the frequency in the first signal after the main valve member 16 closes. Consequently, the flow rate measurement based on the first signal is carried out with no or minimal errors due to lowering of linearity in the correlation between the flow rate and the frequency, and without errors due to the opening of the main valve member 16.

FIG. 4 shows a modified fluidic element. In this construction second passage defining members 12a' and 12b' extend into a space between two partition walls 8a and 8b to positions at short distance 12 from a target 14 and overlapping the partition walls 8a' and 8b' by a suitable length 13. This construction has the advantage of increasing the frequency variations in the signal from the sensor 10 occurring with unit quantity variations of the flow rate to be measured. Furthermore, by setting the suitable overlapping length 13 thereby to permit the partition walls 8a', 8b' to have a large length 11, the return passages 7a and 7b are adapted to perform a rectifying function to check irregular pulses in the signal from the sensor 10. The second passage defining members 12a' and 12b' have a sufficient length so that a restrictor passage defined thereby has a sufficient length 14 to mitigate a variation in width d thereof. As seen, the second passage defining members 12a' and 12b' have inner side walls curved to protrude inwardly. This construction of the second passage defining members further promotes elimination of the irregular pulses.

While in the foregoing embodiment the fluidic element of small nozzle opening and the bypass passage are disposed upstream of the fluidic element of large nozzle opening, the invention may be practiced by reversing this upstream-downstream positional relationship.

Further, the described fluidic flowmeter may be modified in many ways without departing from the scope of this invention.

For example, the auxiliary valve member 26 may be modified with respect to its specific constuction and mounting position.

The diaphragm type governor valve C may be varied with respect to its specific construction as desired. It will readily be understood that the governor valve may be replaced by any other valve means that opens and closes with flow rate variations.

Detecting mode and construction of the sensors 10 and the number thereof may be varied as desired. For example, the sensors 10 may be provided in both return passages 7a and 7b of each fluidic element. The flow rate indicating device 11 too is variable in many ways.

The described flowmeter is primarily intended for measuring household consumption of fuel gas or city water, but is not limited to such application.

We claim:

1. A fluidic flowmeter comprising
a first fluidic element including a converging passage, a jet nozzle disposed downstream of the converging passage, a diverging passage disposed downstream of the jet nozzle, a pair of control nozzles disposed between the jet nozzle and the diverging passage and opposed to each other across and in a direction substantially perpendicular to a direction in which a fluid jet shoots from the jet nozzle, and return passages connecting a downstream position of the diverging passage to the control nozzles, respectively, a second fluidic element connected to said first fluidic element, said second fluidic element being substantially identical in construction to said first fluidic element and including a jet nozzle having a smaller opening area than the jet nozzle of said first fluidic element, and a bypass passage communicating with said first fluidic element in parallel with said second fluidic element, said bypass passage including valve means adapted to open when a flow rate exceeds a predetermined value.

2. A fluidic flowmeter as claimed in claim 1 wherein said second fluidic element and said bypass passage are disposed upstream of said first fluidic element.

3. A fluidic flowmeter as claimed in claim 1 wherein said valve means comprises a diaphragm type governor valve.

4. A fluidic flowmeter as claimed in claim 3 wherein said governor valve includes a main valve member and an auxiliary valve member biased by a spring to a closed position relative to the main valve member, said auxiliary valve member being adapted to open by a fluid pressure upstream thereof when the main valve member is in a closed position.

5. A fluidic flowmeter as claimed in claim 1 further comprising sensors each disposed in one of the return passages of each of said first and second fluidic elements for detecting flow rate variations therein, and a flow rate indicating device adapted to receive frequency signals from said sensors indicating the flow rate variations, derive flow rates from the frequency signals and indicate the flow rates.

6. A fluidic flowmeter as claimed in claim 5 wherein said flow rate indicating device includes evaluating means for judging whether the frequency in first signal received from the sensor in said first fluidic element is below a set value, processing means operable on instructions from said evaluating means to derive the flow rates from a second signal received from the sensor in said second fluidic element when the frequency in said first signal is below the set value and to derive the flow rates from the first signal when the frequency in the first signal exceeds the set value, and display means for indicating the flow rates.

7. A fluidic flowmeter as claimed in claim 6 wherein said evaluating means is adapted to measure the frequency in the first signal even when said valve means is closed, said set value being smaller than the frequency in the first signal at times of opening and closing of said value means.

8. A fluidic flowmeter as claimed in claim 7 wherein said evaluating means has the set value at a substantially midpoint between a minimum frequency in the first signal and a frequency therein at a time immediately before the opening of the valve means.

9. A fluidic flowmeter as claimed in claim 1 wherein each of said first and second fluidic elements includes a restrictor passage disposed downstream of the diverging passage and partly overlapping the return passages.

10. A fluidic flowmeter as claimed in claim 9 wherein said restrictor passage has a sufficient length to mitigate a variation in width thereof, and inner side walls curved to protrude inwardly.

* * * * *